United States Patent
Dannenberg et al.

(10) Patent No.: US 10,037,071 B2
(45) Date of Patent: Jul. 31, 2018

(54) COMPUTE THROUGH POWER LOSS APPROACH FOR PROCESSING DEVICE HAVING NONVOLATILE LOGIC MEMORY

(71) Applicant: Texas Instruments Incorporated, Dallas, TX (US)

(72) Inventors: Andreas Dannenberg, Richardson, TX (US); Brent Peterson, Dallas, TX (US); Aik K. Goh, Irving, TX (US); Joerg Schreiner, Fürstenfeldbruck (DE); Michael Zwerg, Dallas, TX (US); Steven Craig Bartling, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/918,133

(22) Filed: Oct. 20, 2015

(65) Prior Publication Data
US 2016/0246355 A1 Aug. 25, 2016

Related U.S. Application Data

(60) Provisional application No. 62/120,830, filed on Feb. 25, 2015.

(51) Int. Cl.
*G06F 1/00* (2006.01)
*G06F 1/32* (2006.01)
(Continued)

(52) U.S. Cl.
CPC .......... *G06F 1/3275* (2013.01); *G06F 9/4418* (2013.01); *G06F 12/0246* (2013.01);
(Continued)

(58) Field of Classification Search
CPC .............. G06F 1/3275; G06F 19/4418; G06F 12/0246; G06F 1/3243; G06F 1/3287;
(Continued)

(56) References Cited

U.S. PATENT DOCUMENTS 6,081,752 A 6/2000 Benson
6,198,651 B1 3/2001 Lee et al.
(Continued)

OTHER PUBLICATIONS

U.S. Appl. No. 14/887,885, filed Oct. 20, 2015.
(Continued)

*Primary Examiner* — Nitin Patel
(74) *Attorney, Agent, or Firm* — Kenneth Liu; Charles A. Brill; Frank D. Cimino

(57) ABSTRACT

A computing device apparatus facilitates use of a deep low power mode that includes powering off the device's CPU by including a software routine configured to be run by the CPU that effects saving to a non-volatile memory a state of the CPU and/or the device's peripherals before entering the deep low-power mode. The software routine can be configured to control this state storage in response to detecting a low power event, i.e., loss of power sufficient to run the CPU, or a software command to enter the deep low power mode to save power as part of an efficiency program. Then, upon wake up from the deep low power mode, the software routine is first run by the CPU to effect restoring from the non-volatile memory the state of the CPU and the peripherals before execution of a primary application for the central processing unit.

8 Claims, 2 Drawing Sheets

(51) Int. Cl.
*G06F 12/02* (2006.01)
*G06F 9/4401* (2018.01)

(52) U.S. Cl.
CPC .......... *G06F 1/3243* (2013.01); *G06F 1/3287* (2013.01); *G06F 2212/7203* (2013.01); *Y02D 10/14* (2018.01); *Y02D 10/152* (2018.01); *Y02D 10/171* (2018.01); *Y02D 10/44* (2018.01); *Y02D 50/20* (2018.01)

(58) Field of Classification Search
CPC .... G06F 2212/7203; G06F 1/28; G06F 1/266; G06F 9/4418; Y02B 60/186
USPC ........................................................ 713/323
See application file for complete search history.

(56) References Cited

U.S. PATENT DOCUMENTS

| | | | |
|---|---|---|---|
| 6,226,556 B1 | 5/2001 | Itkin | |
| 6,711,692 B1 | 3/2004 | Maeda | |
| 6,901,298 B1 | 5/2005 | Govindaraj | |
| 7,639,056 B2 | 12/2009 | Gururajarao | |
| 8,056,088 B1 | 11/2011 | Dharmapurikar | |
| 9,092,206 B2 | 7/2015 | Rzehak | |
| 2004/0073818 A1* | 4/2004 | Cheok | G06F 9/4418 713/300 |
| 2004/0085846 A1 | 5/2004 | Yokozeki | |
| 2005/0141260 A1 | 6/2005 | Suzuki | |
| 2006/0015683 A1 | 1/2006 | Ashmore | |
| 2006/0072369 A1 | 4/2006 | Madter | |
| 2006/0080515 A1 | 4/2006 | Spiers | |
| 2006/0242398 A1 | 10/2006 | Fontijn | |
| 2006/0279977 A1 | 12/2006 | Shiga | |
| 2007/0083743 A1 | 4/2007 | Tsang | |
| 2007/0136523 A1 | 6/2007 | Bonella | |
| 2007/0217404 A1 | 9/2007 | Kawamata | |
| 2008/0155242 A1 | 6/2008 | Beelitz | |
| 2008/0235471 A1 | 9/2008 | Feldman | |
| 2008/0265962 A1 | 10/2008 | Waldrip | |
| 2009/0237570 A1 | 10/2009 | Paunonen | |
| 2009/0292937 A1 | 11/2009 | Bakker | |
| 2010/0006378 A1 | 10/2010 | Blasko | |
| 2011/0119506 A1 | 5/2011 | Tsai | |
| 2011/0197018 A1 | 8/2011 | Noh | |
| 2011/0202794 A1 | 8/2011 | Kim | |
| 2012/0042206 A1* | 2/2012 | Di Domenico | G06F 11/1441 714/15 |
| 2012/0137075 A1 | 5/2012 | Vorbach | |
| 2012/0036346 A1 | 12/2012 | Bower | |
| 2012/0317343 A1 | 12/2012 | Fuchikami | |
| 2013/0031388 A1 | 1/2013 | Sakarda | |
| 2013/0042052 A1 | 2/2013 | Colgrove | |
| 2014/0006887 A1 | 1/2014 | Greene | |
| 2014/0047247 A1 | 2/2014 | Rzehak | |
| 2014/0075088 A1 | 3/2014 | Bartling et al. | |
| 2014/0075174 A1 | 3/2014 | Bartling | |
| 2014/0075232 A1 | 3/2014 | Batting | |
| 2014/0153325 A1* | 6/2014 | Wang | G11C 13/0004 365/158 |
| 2014/0208004 A1 | 7/2014 | Cohen | |
| 2015/0323983 A1* | 11/2015 | Hobson | G06F 1/3203 713/323 |
| 2017/0109054 A1 | 4/2017 | Waechter et al. | |
| 2017/0185139 A1 | 6/2017 | Zwerg et al. | |

OTHER PUBLICATIONS

Wang, Y., et al., "A 3us Wake-up Time Nonvolatile Processor Based on Ferroelectric Flip-Flops," IEEE 2012 (4 pages).
Masui, S., et al., "Design and Applications of Ferroelectric Nonvolatile SRAM and Slip-Flop with Unlimited Read/Program Cycles and Stable Recall," IEEE 2003 Custom Integrated Circuits Conference—2003 (4 pages).
Udayakumar, K.R., et al., "Manufacturable High-Density 8 Mbit One Transistor-One Capacitor Embedded Ferroelectric Random Access Memory," Japanese Journal of Applied Physics, vol. 47, No. 4, 2008 (4 pages).
Moise, T.S., et al., "Electrical Properties of Submicron (>0.13um2) Ir/PZT/Ir Capacitors Formed on W plugs," IEEE 1999 (3 pages).
Moise, T.S., et al., "Demonstration of a 4Mb, High Density Ferroelectric Memory Embedded with a 130nm, 5LM Cu/FSG Logic Process," IEEE 2002 (4 pages).
Wang, Y., et al., "A Compression-based Area-efficient Recovery Architecture for Nonvolatile Processsors," EDAA 2012, dated Mar. 12-16, 2012, Dresden, Germany (6 pages).
Yu, W., et al., "A Non-Volatile Microcontroller with Integrated Floating-Gate Transistors," IEEE 2011 (6 pages).
TMS9900 Datasheet, programmable system interface; Texas Instruments, retrieved from web at http://www.alldatasheet.com/datsheet-pdf/pdf/29082/TI/TMS9900.html (14 pages).
U.S. Appl. No. 15/016,449

* cited by examiner

COMPUTE THROUGH POWER LOSS APPROACH FOR PROCESSING DEVICE HAVING NONVOLATILE LOGIC MEMORY

RELATED APPLICATION(S)

This application claims the benefit of U.S. Provisional application No. 62/120,830, filed Feb. 25, 2015, which is incorporated by reference in its entirety herein.

TECHNICAL FIELD

This invention generally relates to processing devices having nonvolatile memory and, in particular, to operations for entering and exiting deep low power modes for such processing devices.

BACKGROUND

Electronic devices are continually facing performance pressures including providing increased computing power and providing varied control capabilities. The performance pressures also include needing ever increasing abilities to extend battery life or generally improve power efficiency of a computing device's operation. Accordingly, computing devices of various types include varying ways of enter low power modes that allow the given device to use less power. Low power modes generally include stopping use of various features or powering down certain peripherals for the device.

The lowest of the low power modes typically include actually removing power from a device's central processing unit ("CPU"). Entering into the lowest power modes, however, typically results in such devices not retaining the CPU state. Therefore, the device must be reset upon wakeup to restore an operating state of the CPU and other peripherals. A programmer of applications running on such a device is forced to handle this reset condition and manually restore the application's state to where it was before the device entered into deep low power mode, i.e., power down of the CPU. This is a painful process for customers using such a computing or processing device, which may cause such customers to engage application engineers for assistance with this difficult challenge. As such, the deepest low power modes are not fully or readily available for use by those using these computing devices.

SUMMARY

Generally speaking, pursuant to these various embodiments, a computing device apparatus facilitates use of a deep low power mode that includes powering off the device's CPU by including a software routine configured to be run by the CPU that effects saving to a non-volatile memory a state of the CPU and/or the device's peripherals before entering the deep low-power mode. The software routine can be configured to control this state storage in response to detecting a low power event, i.e., loss of power sufficient to run the CPU, or a software command to enter the deep low power mode to save power as part of an efficiency program. Then, upon wake up from the deep low power mode, the software routine is first run by the CPU to effect restoring from the non-volatile memory the state of the CPU and the peripherals before execution of a primary application for the central processing unit, e.g., continuing with the application task.

So configured, the device need not execute a full reset of the CPU during the wake up from the deep low power mode. Instead, the CPU's and associated peripheral's stable operating state parameters are readily available and restorable from the non-volatile storage, which is able to store such information without consuming power. Also, the software routine can be configured to trigger the storage process at a level of applied power sufficient to guarantee availability of enough power (even in a total power loss event) of storage of the CPU's and/or associated peripheral's state. Also, state information known to be corruptible during sudden power down events can be selectively ignored and not stored during the state storage process thereby allowing for only a limited wake up process, which is quicker and less power consuming that a full wake up routine for the CPU. These and other benefits will become apparent through study of the following description and drawings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
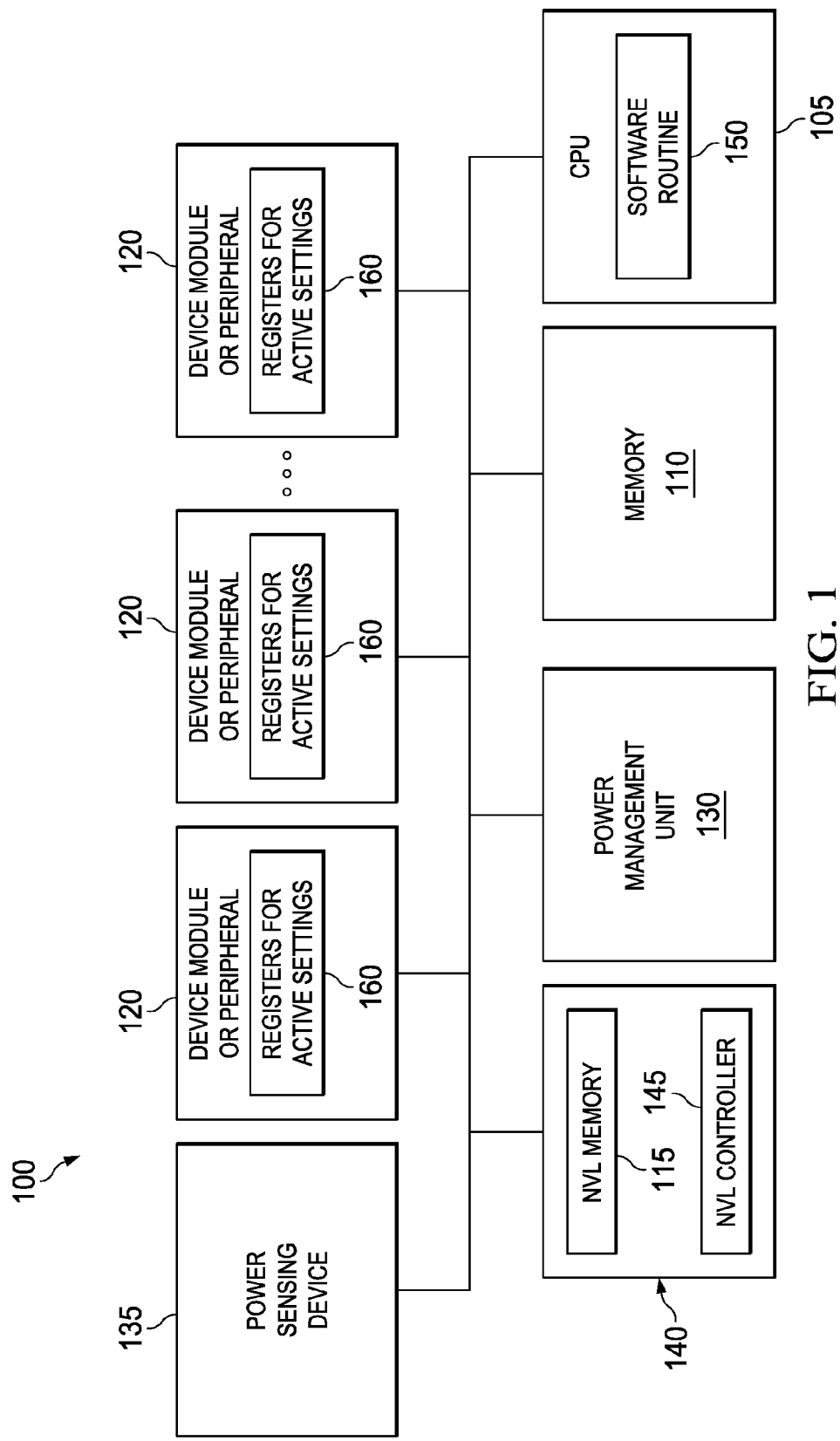
FIG. 1 comprises a block diagram illustrating an example computing device as configured in accordance with various embodiments of the invention.

Turning now to the figures, especially FIG. 1, an example computing device apparatus that is compatible with many of these teachings will now be described. The computing device 100 includes a central processing unit ("CPU") 105, a memory sub-system 110, a non-volatile memory 115, and a number of peripherals or device modules 120. A power management unit 130 or peripheral power sensing device 135 is configured to detect presence or absence of power for the CPU 105. Each of these elements are individually known in the art such that no further description is necessary. For instance, the non-volatile memory 115 is part of a non-volatile sub-system 140, which includes a non-volatile controller 145. The NVL memory 115 itself may be a flash-type memory, a ferro-magnetic random access memory ("FRAM") based state retention technology that combines characteristics of FRAM memory with current data retention methods or other technologies with similar features such as spin-torque magnetoresistive random access memory ("MRAM") or resistive access memory ("RRAM"). Such memory technology is known in the art and requires no further description; see, for example, regarding FRAM U.S. Patent Application Publication Number 2014/0075088, which is incorporated herein by reference in its entirety.

In one approach to conserving power, the power management unit 130 is configured to effect switching off power applied to the CPU 105, the peripherals 120 for the computing device apparatus 100, and the memory sub-system 110 to reach a deep low-power mode. A software routine 150 is configured to be run by the CPU 105 to effect saving to the non-volatile memory 115 a state of the CPU 105 and the peripherals 120 before entering the deep low-power mode. The software routine 150 is configured to be triggered to save the state and enter the deep low power mode in response to one or more of receiving indication of a power loss from the power management unit 130 or the peripheral power sensing device 135, a software request to enter the deep low power mode, or a peripheral driven interrupt event. In effect, any of a number of deep sleep events can be monitored by the software routine and be used by the routine to effect storage of the state of the device immediately prior (or a previously stable state) to the non-volatile memory, which preserves the information without drawing power. The deep sleep events can include determination of a loss of power sufficient to operate the computing device or simply a command to enter a deep low power mode to converse power even if it is otherwise available.

Instead of saving the critical system state upon power loss (and thus tracking changes in machine state over time), the software routines can be configured to allow a static snapshot of the system state to be captured. For example, the software routine is configured to store the state of the CPU 105 by storing one or more of program counters, stack pointers, status registers, general purpose registers, or other key state information of the CPU 105. Similarly, the software routine can be configured to store the state of the one or more peripherals 120 associated with the CPU 105 by storing one or more of peripheral configuration registers, peripheral state registers, peripheral status registers, peripheral data buffers, and other key peripheral state information that may be stored in active settings configuration registers 160 associated with the peripherals 120. The state's static image could be restored upon each system reset or power up reset so that a stable and repeatable machine state can be recovered instead. This capability would be most useful for applications that must repeat a specific function without deviation once the device is powered up. Starting up in a repeatable state is beneficial for this class of application.

Upon wakeup from low power mode the special software routine 150 is called instead of the normal device initialization code. The software routine 150 is configured to effect restoring the state of the CPU 105 and the peripherals 120 from the non-volatile memory 115 before execution of a primary application for the central processing unit. With the CPU state restored, the software routine 150 then returns control to the main application for the computing device 100.

Figures 2, 3, 4:
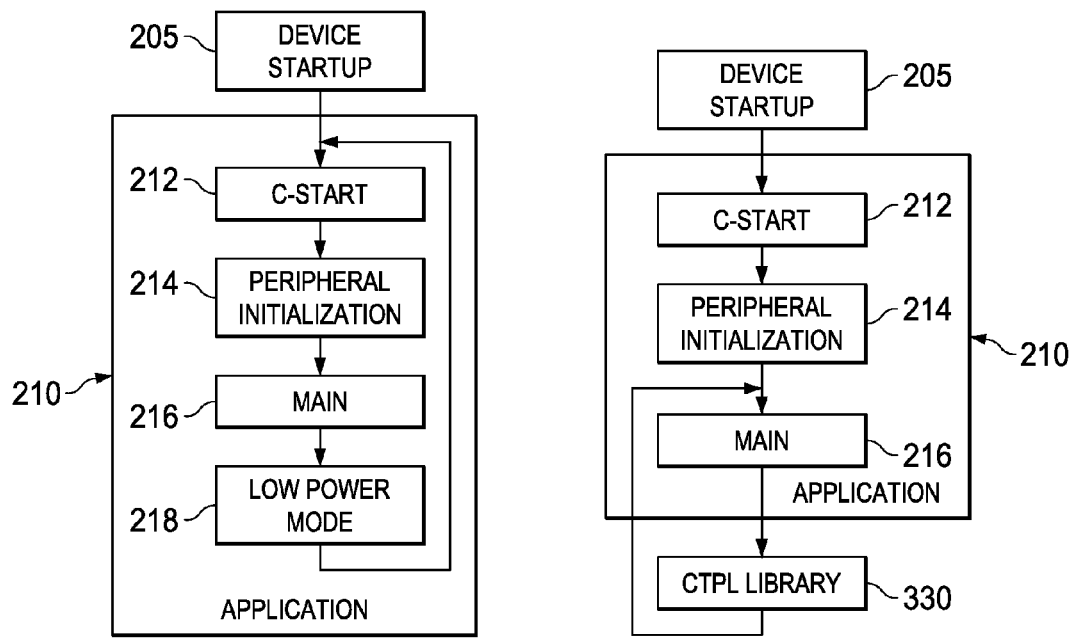
FIG. 2 comprises a flow diagram illustrating an example operational flow for certain prior art computing devices having low power modes.
FIG. 3 comprises a flow diagram illustrating an example operational flow for a computing device as configured in accordance with various embodiments of the invention.
FIG. 4 comprises a flow diagram illustrating another example operational flow for a computing device as configured in accordance with various embodiments of the invention.

The change in approach from prior solutions is illustrated through comparison of FIGS. 2 and 3. In FIG. 2, the prior approach is illustrated where a full boot or device startup 205 is executed prior to running the primary application 210 for the computing device 100. The typical application 210 includes a C-start routine 212 that initializes the CPU 105 for the application 210, which is followed by a peripheral initialization routine 214 to configure the device's peripherals 120. The main portion 216 of the application then runs. If the application 210 needs to enter a low power mode 216, to ensure a stable state of the device 100 upon wake up, the low power mode 218 passes control back to the C-start routine 212 to run through the entire start-up routine prior to re-starting the main portion 216 of the application. This means that much time and power is consumed upon every exit from the low power mode 218 to ensure a stable state for the device 100.

In contrast, as illustrated in FIG. 3, instead of passing control to the typical low power mode routine 216, a special software routine is called. In this example, the software routine is call a compute through power loss ("CTPL") library 330, which operates as described herein to save a state of the device and/or peripherals to non-volatile storage. Upon wake up, this same software routine (or other routine configured to operate as described) 330 is called to restore the state stored in the non-volatile storage to the device registers. After the restoration, control passes immediately to the main portion 216 of the application 210, thereby skipping the C-start routine 212 and the peripheral initialization routine 214. This is possible because the stable state stored in the non-volatile memory allows for stable operation of the device 100 without needing the full boot sequence. Accordingly, power and time are saved on wake up from a deep low power mode than include powering down the CPU.

FIG. 4 further illustrates an example method of operation in accord with these teachings. A processing device having a CPU and using a plurality of volatile storage elements is operating through execution of a primary application 405. A deep sleep event including one or both of a low power event for the processing device or a software signal to enter a deep low power mode is detected 410. In response to detecting the deep sleep event and before allowing entry into a deep low power mode by the central processing unit, a special software routine 420 is called. The software routine 420 operating on the CPU is used to effect storage of a state comprising contents of the plurality of volatile storage elements of the CPU and/or one or more peripherals for the CPU to non-volatile memory. More specifically, the effecting storage of the state includes storing 422 peripheral configuration registers, peripheral state registers, peripheral status registers, peripheral data buffers, and other key peripheral state information. The effecting storage of the state also includes storing 424 program counters, stack pointers, status registers, general purpose registers, and other key state information of the CPU. After storing the state to the non-volatile memory, the device enters the deep low power is then entered 428.

The method further includes detecting 430 while in the deep low power mode a wake up event including one or both of restoration of power to the processing device or a software signal to wake up, such as an intercepted reset signal. In response to detecting the wake up event, the software routine 420 is called before the application 405. The software routine 420 is used to effect restoring at least a portion of the state from the non-volatile memory in lieu of execution of a wake up process for the CPU from the deep low power mode. More specifically, the state information regarding the CPU stack is restored 432 from the non-volatile memory, and the state information regarding the peripherals is restored 434 from the non-volatile memory. After this restoration, control passes to the application 405 without proceeding through the typical wake up or reset routine used to set such operating parameters for the CPU and associated peripherals on a cold boot.

So configured, this configuration saves the time and energy required to reboot and/or reconfigure the computing device, such as a system on a chip ("SOC") device, and also the energy required to re-initialize the high level software programming language used to implement the required application functionality. Because the solution does not require additional hardware to be integrated into the SOC, the solution is available for existing devices. This solution is particularly well suited to FRAM based non-volatile memory technology because FRAM has essentially unlimited write endurance (at least as high as $10^{14}$) and low write power and high write speed.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A computing device apparatus comprising:
    a central processing unit;
    a memory sub-system;
    a non-volatile memory comprising FRAM (ferro-magnetic random access memory);
    a power management unit or peripheral power sensing device configured to detect presence or absence of power for the central processing unit;
        wherein the power management unit is configured to effect switching off power applied to the central processing unit, peripherals for the computing device apparatus, and the memory sub-system to reach a deep low-power mode;
    a software routine configured to be run by the central processing unit to effect saving to the non-volatile memory a state of the central processing unit and the peripherals before entering the deep low-power mode and to effect restoring the state of the central processing unit and the peripherals from the non-volatile memory before execution of a primary application for the central processing unit;
        wherein the software routine is configured to be triggered to effect saving the state and entry into the deep low power mode in response to one or more of receiving indication of a power loss from the power management unit or the peripheral power sensing device, a software request to enter the deep low power mode, or a peripheral driven interrupt event.

2. The computing device apparatus of claim 1 wherein the software routine is configured to store the state of the central processing unit by storing one or more of program counters, stack pointers, status registers, general purpose registers, or other key state information of the central processing unit.

3. The computing device apparatus of claim 1 wherein the software routine is configured to store the state of the one or more peripherals associated with the central processing unit by storing one or more of peripheral configuration registers, peripheral state registers, peripheral status registers, peripheral data buffers, and other key peripheral state information.

4. The computing device apparatus of claim 1 wherein the non-volatile memory has a write cycle endurance of or greater than $10^{14}$.

5. A method comprising:
    operating a processing device having a central processing unit and using a plurality of volatile storage elements;
    switching off, by a power management unit, power to the central processing unit, a plurality of peripheral devices, and a memory subsystem;
    detecting a deep sleep event including one or both of a low power event for the processing device or a software signal to enter a deep low power mode;
    in response to detecting the deep sleep event and before allowing entry into a deep low power mode by the central processing unit, using a software routine operating on the central processing unit to effect storage of a state comprising contents of the plurality of volatile storage elements of the central processing unit and/or one or more peripherals for the central processing unit to non-volatile memory comprising FRAM;
    detecting while in the deep low power mode a wake up event including one or both of restoration of power to the processing device or a software signal to wake up;
    in response to detecting the wake up event, using the software routine to effect restoring at least a portion of the state from the non-volatile memory in lieu of execution of a wake up process for the central processing unit from the deep low power mode.

6. The method of claim 5 wherein the effecting storage of the state comprises storing program counters, stack pointers, status registers, general purpose registers, and other key state information of the central processing unit.

7. The method of claim 5 wherein the effecting storage of the state comprises storing peripheral configuration registers, peripheral state registers, peripheral status registers, peripheral data buffers, and other key peripheral state information.

8. A computing device apparatus comprising:
    a central processing unit;
    a memory sub-system;
    a non-volatile memory comprising FRAM;
    a power management unit or peripheral power sensing device configured to detect presence or absence of power for the central processing unit;
    wherein the power management unit is configured to effect switching off power applied to the central processing unit, peripherals for the computing device apparatus, and the memory sub-system to reach a deep low-power mode;
    a software routine configured to be run by the central processing unit to effect saving to the non-volatile memory a state of the central processing unit and the peripherals before entering the deep low-power mode and to effect restoring the state of the central processing unit and the peripherals from the non-volatile memory before execution of a primary application for the central processing unit;
    wherein the non-volatile memory software routine is configured to store the state of the central processing unit by storing one or more of program counters, stack pointers, status registers, general purpose registers, or other key state information of the central processing unit;
    wherein the non-volatile memory software routine is configured to store the state of the one or more peripherals associated with the central processing unit by storing one or more of peripheral configuration registers, peripheral state registers, peripheral status registers, peripheral data buffers, and other key peripheral state information;
    wherein the software routine is configured to be triggered to save the state and enter the deep low power mode in response to one or more of receiving indication of a power loss from the power management unit or the peripheral power sensing device, a software request to enter the deep low power mode, or a peripheral driven interrupt event;

wherein, in response to detecting sufficient power to exit a low power mode or recover from a power loss condition, the power management unit is configured to issue a power up signal regarding exiting a deep low power mode or power loss condition.

\* \* \* \* \*